(12) United States Patent
Baskar et al.

(10) Patent No.: US 10,711,501 B2
(45) Date of Patent: Jul. 14, 2020

(54) ACTIVE ANTI-FLUTTER SYSTEM FOR A MOTOR VEHICLE

(71) Applicant: FORD GLOBAL TECHNOLOGIES, LLC, Dearborn, MI (US)

(72) Inventors: Shunmugam Baskar, West Bloomfield, MI (US); Michael J. Gardynik, Farmington Hills, MI (US); Venkatasamy Veluchamy, Rochester Hills, MI (US); Christina Dung Nguyen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 616 days.

(21) Appl. No.: 15/490,386

(22) Filed: Apr. 18, 2017

(65) Prior Publication Data
US 2018/0298667 A1 Oct. 18, 2018

(51) Int. Cl.
E05F 7/04 (2006.01)
B62D 25/12 (2006.01)
F16F 15/03 (2006.01)
E05C 19/16 (2006.01)
H01F 7/06 (2006.01)
H01F 27/24 (2006.01)
H01F 27/28 (2006.01)

(52) U.S. Cl.
CPC ............... E05F 7/04 (2013.01); B62D 25/12 (2013.01); E05C 19/16 (2013.01); F16F 15/03 (2013.01); H01F 7/064 (2013.01); H01F 27/24 (2013.01); H01F 27/28 (2013.01); E05Y 2900/536 (2013.01)

(58) Field of Classification Search
CPC .. E05F 7/04; E05C 19/16; F16F 15/03; H01F 27/28; H01F 27/24; H01F 7/064; H01F 7/1844; H01F 2007/1866; B62D 25/12; E05Y 2900/536; E05B 77/38; H01H 47/325; H01H 47/002; H01H 50/54; H01H 50/18; H01H 2047/006
USPC ........................................................ 361/143
See application file for complete search history.

(56) References Cited

U.S. PATENT DOCUMENTS

| 6,415,882 | B1 | 7/2002 | Schuster et al. |
| 6,923,496 | B1 | 8/2005 | Pleet et al. |
| 7,399,028 | B1 | 7/2008 | Castillo et al. |
| 7,635,157 | B2 | 12/2009 | Wang et al. |
| 8,366,189 | B2 | 2/2013 | Schmitz |

(Continued)

FOREIGN PATENT DOCUMENTS

DE 10163820 A1 7/2003

OTHER PUBLICATIONS

English Machine Translation of DE10163820A1.

Primary Examiner — Dharti H Patel
(74) Attorney, Agent, or Firm — David Coppiellie; King & Schickli, PLLC

(57) ABSTRACT

An active anti-flutter system is provided for a motor vehicle. That active anti-flutter system includes an electromagnet on a first component, a ferromagnetic target on a second component and a controller. The controller is configured to energize the electromagnet to generate a magnetic flux that attracts the ferromagnetic target toward the electromagnet thereby reducing vibration of one of the first component and the second component. A method of reducing flutter of a closure panel on a motor vehicle is also disclosed.

19 Claims, 4 Drawing Sheets

(56) References Cited

U.S. PATENT DOCUMENTS

| | | |
|---|---|---|
| 2013/0219658 A1 | 8/2013 | Krajewski et al. |
| 2015/0021129 A1* | 1/2015 | Eckel .................... B62D 7/222 188/267 |
| 2016/0297485 A1 | 10/2016 | Lee et al. |

* cited by examiner

ACTIVE ANTI-FLUTTER SYSTEM FOR A MOTOR VEHICLE

TECHNICAL FIELD

This document relates generally to the motor vehicle equipment field and, more particularly, to an active anti-flutter system for mitigating flutter and vibration in a motor vehicle component as well as to an anti-flutter hood lock system and a method of reducing flutter of a closure panel on a motor vehicle.

BACKGROUND

Various components of a motor vehicle including, for example, doors, deck lids, trunk lids, lift gates and hoods are subjected to undesirable transient vibration during motor vehicle operation. For example, a hood may be subjected to visible vibration due to high speed driving or induced oscillation due to turbulent flow from a vehicle wake that occurs with a vehicle passing maneuver or from crosswind yaw or flow behind another vehicle.

This document relates to a new and improved active anti-flutter system, active anti-flutter hood lock system and method of reducing flutter of a closure panel on a motor vehicle.

SUMMARY

In accordance with the purposes and benefits described herein, an active anti-flutter system is provided for a motor vehicle. That active anti-flutter system comprises an electromagnet on a first component, a ferromagnetic target on a second component, and a controller configured to energize the electromagnet to generate a magnetic flux that attracts the ferromagnetic target toward the electromagnet thereby reducing vibration of one of the first component and the second component.

The controller may be configured to energize the electromagnet when the motor vehicle is in motion. The controller may be configured to energize the electromagnet when doors of the motor vehicle are locked and the motor vehicle is in motion.

The electromagnet may include a core and a coil wrapped around the core. The active anti-flutter system may further include a door lock monitoring device and the controller may be configured to include a door lock status data input connected to the door lock monitoring device. The active anti-flutter system may further include a motor vehicle speed monitoring device and the controller may be configured to include a motor vehicle speed data input connected to the motor vehicle speed monitoring device. In any of the many possible embodiments, the first component may be a structural component of the motor vehicle and the second component may be a closure panel of the motor vehicle.

In accordance with an additional aspect, an anti-flutter hood lock system is provided for a motor vehicle. That anti-flutter hood lock system comprises an electromagnet carried on a support component of the motor vehicle and a ferromagnetic target carried on a hood of the motor vehicle. The anti-flutter hood look system also includes a controller. That controller is configured to energize the electromagnet to generate a magnetic flux that attracts the ferromagnetic target toward the electromagnet thereby reducing vibration of the hood.

The controller may be configured to energize the electromagnet when the motor vehicle is in motion. The controller may be configured to energize the electromagnet when the doors of the motor vehicle are locked and the motor vehicle is in motion.

In accordance with still another aspect, a method is provided of reducing flutter of a closure panel on a motor vehicle. That method comprises the steps of: (a) energizing, by a controller, an electromagnet carried on a supporting structure, (b) generating, by the electromagnet, a magnetic flux and (c) attracting a ferromagnetic target on the closure panel toward the electromagnet and thereby dissipating closure panel flutter.

The method may further include the step of configuring the controller to energize the electromagnet when the motor vehicle is in motion. The method may include the step of configuring the controller to energize the electromagnet when the doors of the motor vehicle are locked and the motor vehicle is in motion.

The method may further include the step of mitigating closure panel vibration during high speed driving by applying a magnetic field. The method may include the step of mitigating closure panel oscillation due to turbulent airflow occurring during a vehicle passing maneuver by applying a magnetic field.

The method may include the step of providing the ferromagnetic target on a hood of the motor vehicle. Further, the method may include the step of mounting the electromagnet to a cowl of the motor vehicle underneath the hood where the electromagnet may contact the ferromagnetic target when the hood is closed and the electromagnet is energized.

In the following description, there are shown and described several preferred embodiments of the active anti-flutter system, the active anti-flutter hood lock system and the related method of reducing flutter of a closure panel on a motor vehicle. As it should be realized, the active anti-flutter system, active anti-flutter hood lock system and related method are capable of other, different embodiments and their several details are capable of modification in various, obvious aspects all without departing from the active anti-flutter system, active anti-flutter hood lock system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active anti-flutter system, active anti-flutter hood lock system and method of reducing flutter of a closure panel on a motor vehicle and together with the description serve to explain certain principles thereof.

Reference will now be made in detail to the present preferred embodiments of the active anti-flutter system and active anti-flutter hood lock system, examples of which are illustrated in the accompanying drawing figures.

DETAILED DESCRIPTION

Figure 1:
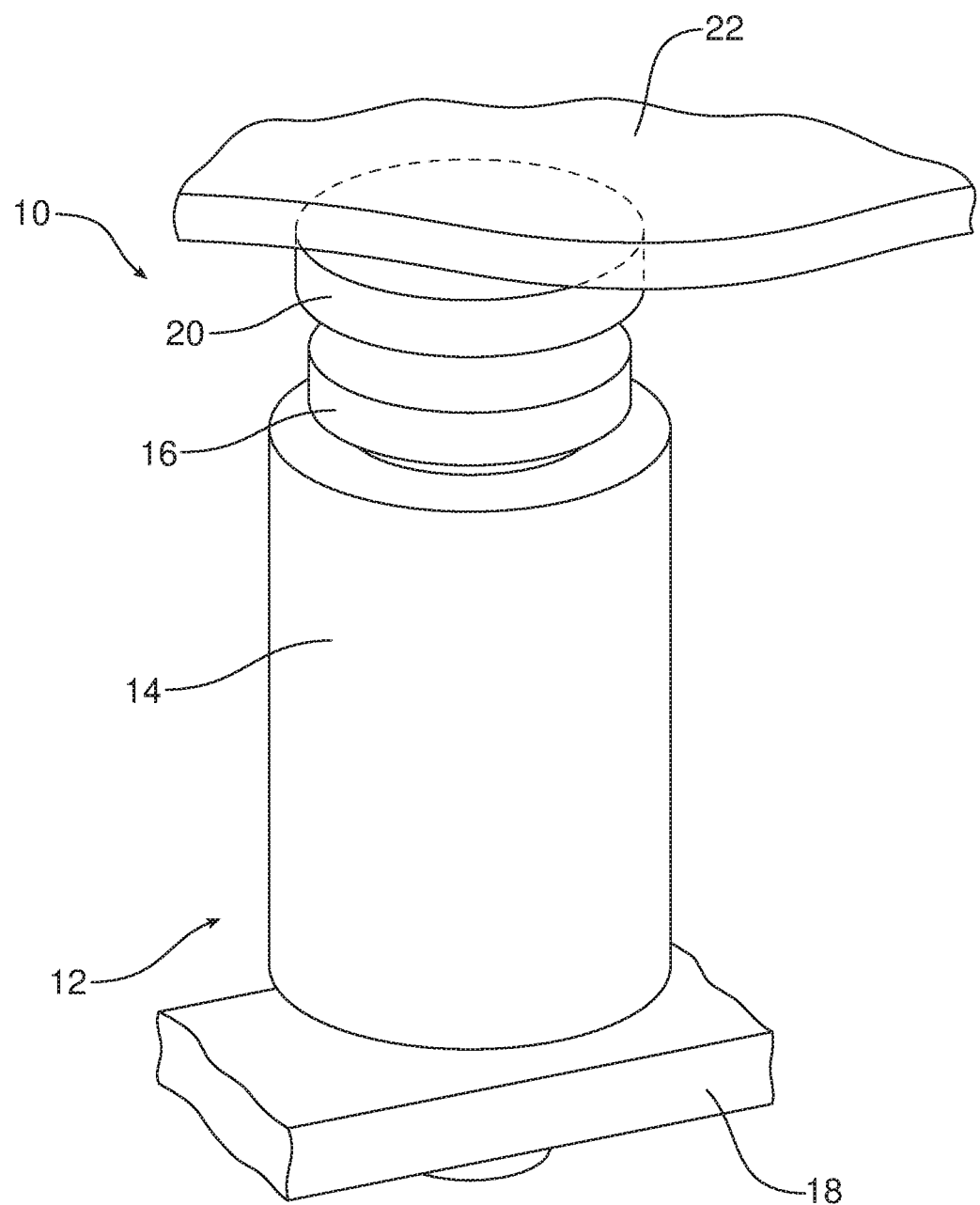
FIG. 1 is a detailed perspective view of the active anti-flutter system.
Figure 2:
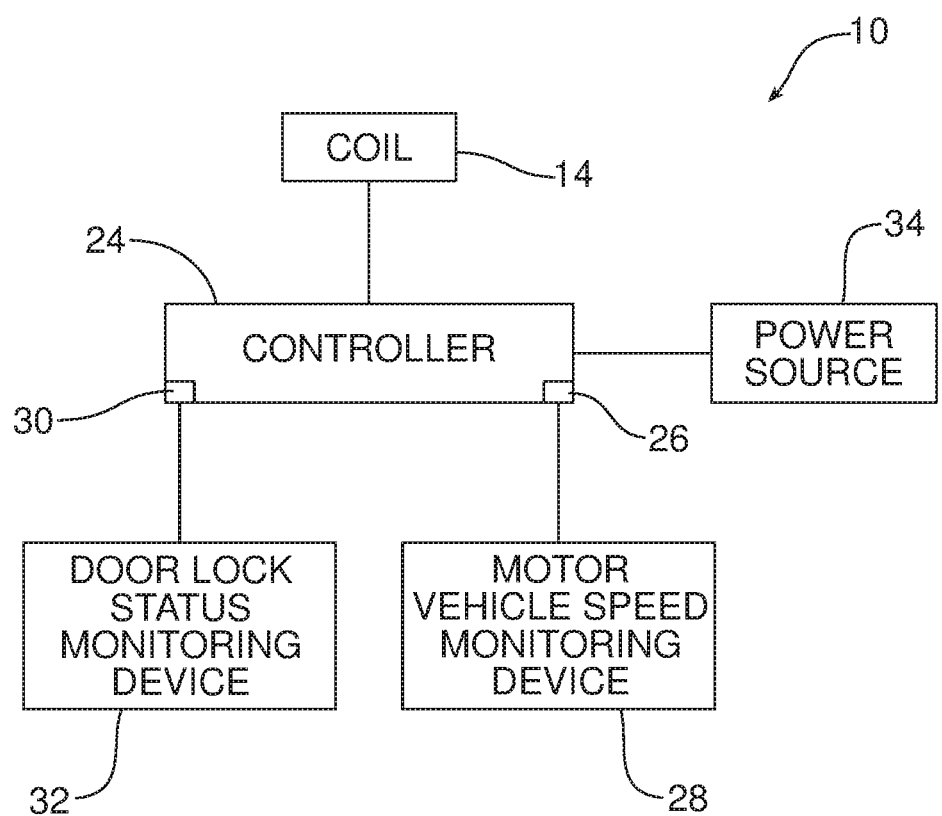
FIG. 2 is a schematic block diagram of the control system for the active anti-flutter system or active anti-flutter hood lock system.

Reference is now made to FIGS. 1 and 2 illustrating the active anti-flutter system 10 that may be utilized on a motor vehicle in order to mitigate vibration and flutter of a motor vehicle component in the manner described in greater detail below.

The active anti-flutter system includes an electromagnet 12 which comprises a coil 14 wrapped around a core 16. As is known in the art, the coil 14 may comprise an insulated wire while the core 16 may be made from a ferromagnetic or ferrimagnetic material such as iron. When the coil 14 is energized, the current running through the coil creates a magnetic field which is concentrated by the core thereby making a more powerful magnet. In the illustrated embodiment, the electromagnet 12 is carried on and secured to a first component 18.

The active anti-flutter system 10 also includes a ferromagnetic target 20 for the electromagnet 12. The ferromagnetic target 20 may be made from soft iron plate. In the illustrated embodiment, the ferromagnetic 20 is fixed to a second component 22.

The first component 18 may comprise a structural component of the motor vehicle such as, for example, a structural support for a closure panel or the like. The second component 22 may comprise a closure panel including, but not necessarily limited to a hood, a door, a deck lid, a trunk lid, a lift gate or a tailgate.

As illustrated in FIG. 2, the active anti-flutter system 10 also includes a controller 24. The controller 24 may comprise a computing device such as a dedicated microprocessor or an electronic control unit (ECU) operating in accordance with instructions from appropriate control software. Thus, the controller 24 may comprise one or more processors, one or more memories and one or more network interfaces all in communication with each other over a communication bus. In some embodiments, the controller 24 may comprise the body control module of the motor vehicle also known as a BCM.

As is known in the art, a BCM may perform a number of interior body electrically based functions, including, for example, interior locking, remote key entry, interior lighting, exterior lighting, windshield wiper control and the like. In some embodiments, the BCM may also function to control entertainment functions (e.g. radio, CD player) and communications, such as telephone and Internet communications over a wireless network. In some embodiments, the BCM is connected by a communication bus to other control modules that provide one or more of these additional functions.

The controller 24 is configured to energize the electromagnet 12, more particularly the coil 14 of the electromagnet, in order to generate a magnetic flux that attracts the ferromagnetic target 20 fixed to the second component 22 toward the electromagnet 12 thereby reducing vibration or flutter of either the first component or the second component.

The controller 24 may be configured to energize the electromagnet 12 when the motor vehicle is in motion. Alternatively, or in addition, the controller 24 may be configured to energize the electromagnet 12 when doors (not shown) of the motor vehicle are locked utilizing the central locking system or key FOB of the motor vehicle in a manner known in the art. Toward this end, the controller 24 may include a motor vehicle speed data input 26 that is connected to a motor vehicle speed monitoring device 28 of a type known in the art for monitoring the speed of a motor vehicle. The controller 24 may also include a door lock status data input 30 connected to a door lock status monitoring device 32 of a type known in the art for monitoring the status of the door locks of the motor vehicle.

Operation of the active anti-flutter system 10 may be initiated when the ignition of the motor vehicle is switched on. The controller 24 then monitors the status of the door locks by means of door lock status data provided by the door lock status monitoring device 32 to the door lock status data input 30. Similarly, upon activation, the controller 24 monitors motor vehicle speed based upon motor vehicle speed data provided by the motor vehicle speed monitoring device 28 to the motor vehicle speed data input 26. Upon the doors of the motor vehicle being locked and the motor vehicle put into motion or exceeding a predetermined speed, the controller 24 directs power from the power source 34 of the motor vehicle to the coil 14. The current flowing through the coil 14 produces a magnetic flux that is concentrated by the core 16 so as to draw the ferromagnetic target 20 fixed to the second component 22 tightly against the core 16 fixed to the first component 18. This strong attraction mitigates vibration and flutter between the two components 18, 22.

Figure 3:
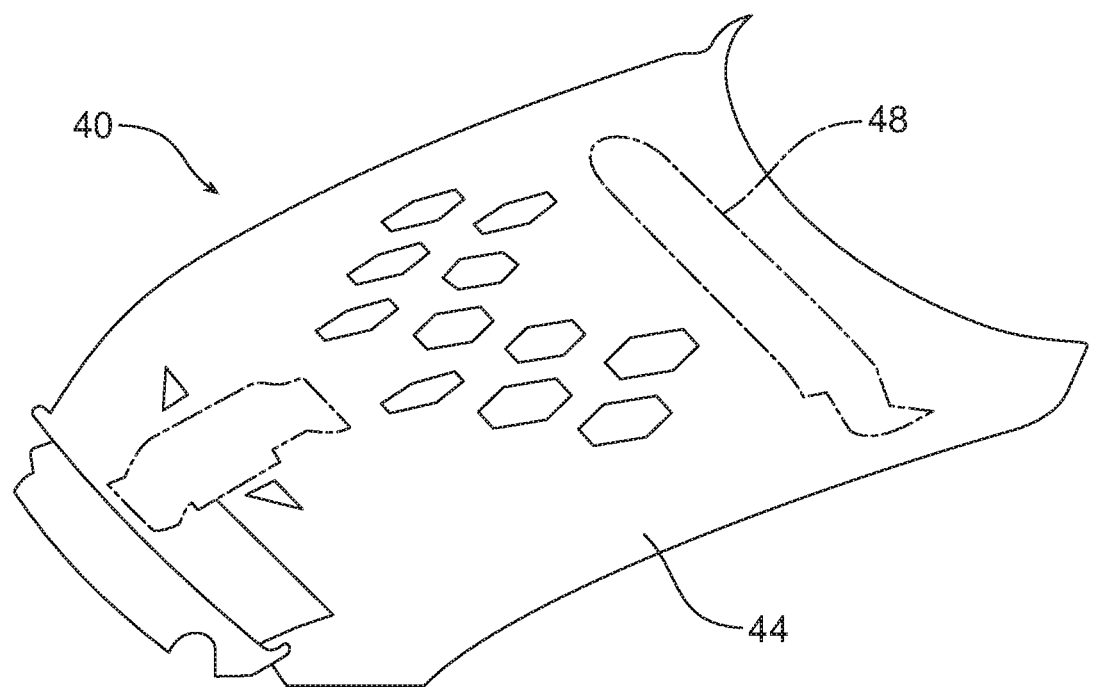
FIG. 3 is a perspective view of the hood and cowl of a motor vehicle equipped with the active anti-flutter hood lock system.
Figure 4:
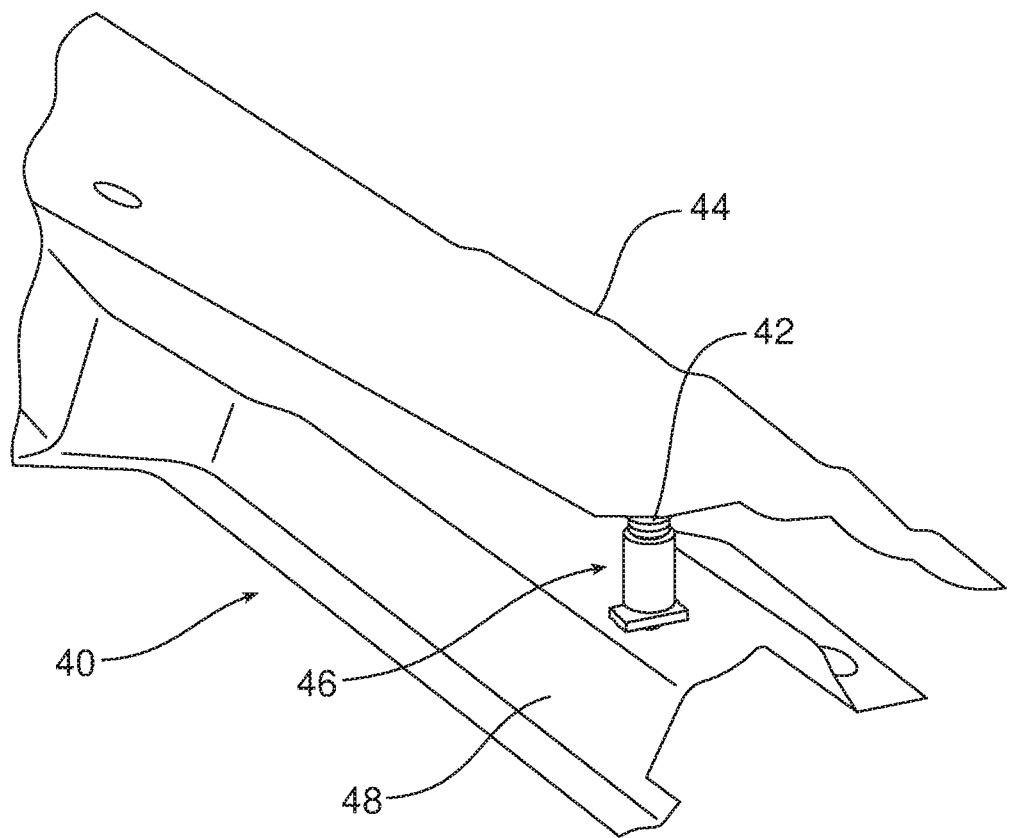
FIG. 4 is a detailed view of the active anti-flutter hood lock system illustrated in FIG. 3.

Reference is now made to FIGS. 3 and 4 illustrating an active anti-flutter hood lock system 40. The anti-flutter hood lock system 40 includes a ferromagnetic target 42 secured to the hood 44 of the motor vehicle and a cooperating electromagnet 46 secured to the cowl 48 of the motor vehicle underneath the hood 44 where the electromagnet may contact the ferromagnetic target 42 when the hood is closed. The anti-flutter hood lock system 40 also includes a control system as illustrated in FIG. 2 that operates in an identical manner to that described above for the active anti-flutter system 10.

Consistent with the above description, a method is provided of reducing flutter of a closure panel, such as hood 44, on a motor vehicle. That method comprises the steps of energizing, by the controller 24, an electromagnet 12 or 46 carried on a supporting structure such as the first component 18 or cowl 48, generating, by the electromagnet, the magnetic flux and attracting a ferromagnetic target 20 or 42 toward the electromagnet and thereby dissipating closure panel flutter.

The method may include configuring the controller 24 to energize the electromagnet 12 or 46 when the doors of the motor vehicle are locked. Alternatively, or in addition, the method may include configuring the controller 24 to energize the electromagnet 12 or 46 when the motor vehicle is in motion.

Still further, the method may include the step of mitigating closure panel 18, 44 vibration during high speed driving by applying a magnetic field. The method may include the step of mitigating closure panel 18/hood 44 oscillation due to turbulent airflow occurring during a vehicle passing maneuver by applying a magnetic field.

Further, as illustrated in FIGS. 3 and 4, the method may include providing the ferromagnetic target 42 on the hood 44 of the motor vehicle. In addition, the method may include mounting the electromagnet 46 to the cowl 48 of the motor vehicle underneath the hood 44 where the electromagnet may contact the ferromagnetic target 42 when the hood is closed.

The foregoing has been presented for purposes of illustration and description. It is not intended to be exhaustive or to limit the embodiments to the precise form disclosed. Obvious modifications and variations are possible in light of the above teachings. For example, the controller 24 could be configured to include a data input connected to a motor vehicle transmission monitoring device and to energize the electromagnet 12 or 46 whenever the transmission is put into a drive gear engaging the motor of the motor vehicle with the drive wheels. While not specifically mentioned above, the active anti-flutter system 10 may also be used in conjunction with a center opening truck door feature to mitigate seal slap noise during vehicle operation. All such modifications and variations are within the scope of the appended claims when interpreted in accordance with the breadth to which they are fairly, legally and equitably entitled.

What is claimed:

1. An active anti-flutter system for a motor vehicle, comprising:
    an electromagnet on a first component;
    a ferromagnetic target fixed to a second component; and
    a controller configured to energize said electromagnet to generate a magnetic flux that attracts said ferromagnetic target toward said electromagnet thereby reducing vibration of one of said first component and said second component.

2. The active anti-flutter system of claim 1, wherein said controller is configured to energize said electromagnet when said motor vehicle is in motion.

3. The active anti-flutter system of claim 1, wherein said controller is configured to energize said electromagnet when doors of said motor vehicle are locked and said motor vehicle is in motion.

4. The active anti-flutter system of claim 3, wherein said electromagnet includes a core and a coil wrapped around said core.

5. The active anti-flutter system of claim 4, further including a door lock monitoring device and said controller is configured to include a door lock status data input connected to said door lock monitoring device.

6. The active anti-flutter system of claim 5, further including a motor vehicle speed monitoring device and said controller is configured to include a motor vehicle speed data input connected to said motor vehicle speed monitoring device.

7. The active anti-flutter system of claim 3, further including a door lock monitoring device and said controller is configured to include a door lock status data input connected to said door lock monitoring device.

8. The active anti-flutter system of claim 7, wherein said electromagnet includes a core and a coil wrapped around said core.

9. The active anti-flutter system of claim 1, wherein said first component is a structural component of said motor vehicle and said second component is a closure panel of said motor vehicle.

10. An anti-flutter hood lock system for a motor vehicle, comprising:
    an electromagnet carried on a support component of said motor vehicle;
    a ferromagnetic target fixed on a hood of said motor vehicle; and
    a controller configured to energize said electromagnet to generate a magnetic flux that attracts said ferromagnetic target toward said electromagnet thereby reducing vibration of said hood.

11. The anti-flutter hood lock system of claim 10, wherein said controller is configured to energize said electromagnet when said motor vehicle is in motion.

12. The anti-flutter hood lock system of claim 10, wherein said controller is configured to energize said electromagnet when doors of said motor vehicle are locked and said motor vehicle is in motion.

13. A method of reducing flutter of a closure panel on a motor vehicle, comprising:
    energizing, by a controller, an electromagnet carried on a supporting structure;
    generating, by said electromagnet, a magnetic flux; and
    continuously attracting a ferromagnetic target on said closure panel toward said energized electromagnet and thereby dissipating closure panel flutter.

14. The method of claim 13, including configuring said controller to energize said electromagnet when said motor vehicle is in motion.

15. The method of claim 13, including configuring said controller to energize said electromagnet when doors of said motor vehicle are locked and when said motor vehicle is in motion.

16. The method of claim 13, including mitigating closure panel vibration during driving by applying a magnetic field.

17. The method of claim 13, including mitigating closure panel oscillation due to turbulent airflow occurring during a vehicle passing maneuver by applying a magnetic field.

18. The method of claim 13, including providing said ferromagnetic target on a hood of said motor vehicle.

19. The method of claim 18, including mounting said electromagnet to a cowl of said motor vehicle underneath said hood where said electromagnet contacts said ferromagnetic target when said hood is closed.

* * * * *